March 4, 1952     H. E. JOHNSON     2,587,624
RETRACTABLE WHEEL SUSPENSION FOR VEHICLES Filed May 27, 1948     2 SHEETS—SHEET 1

INVENTOR.
Harold E. Johnson
BY
W. J. Eccleston
ATTORNEY

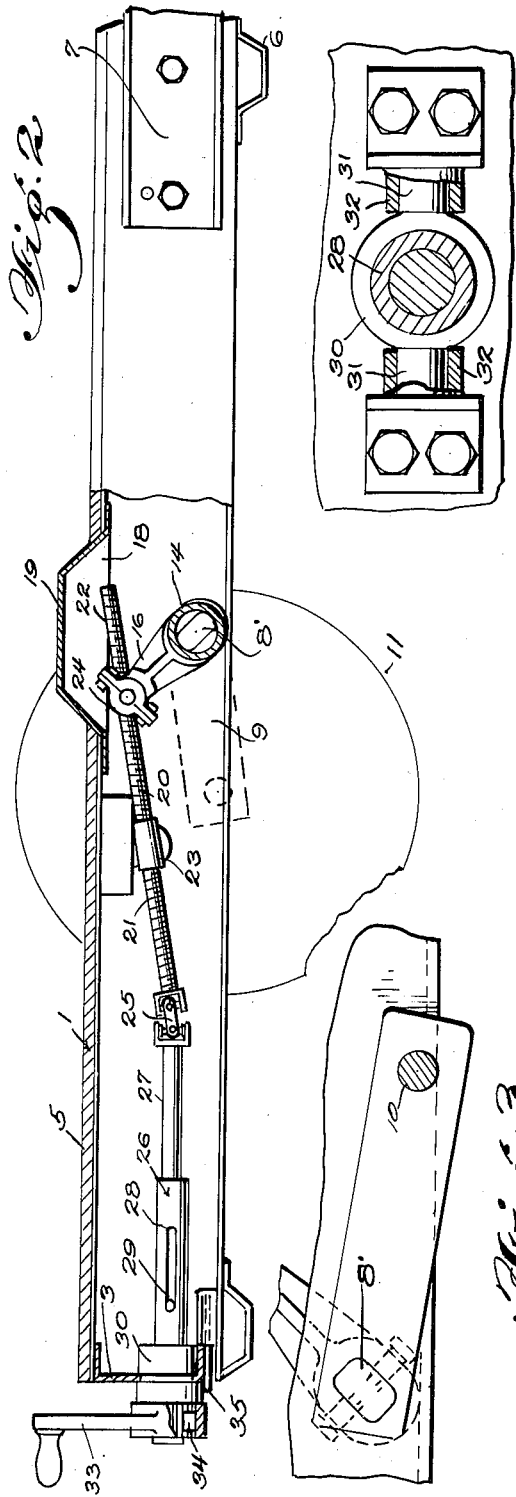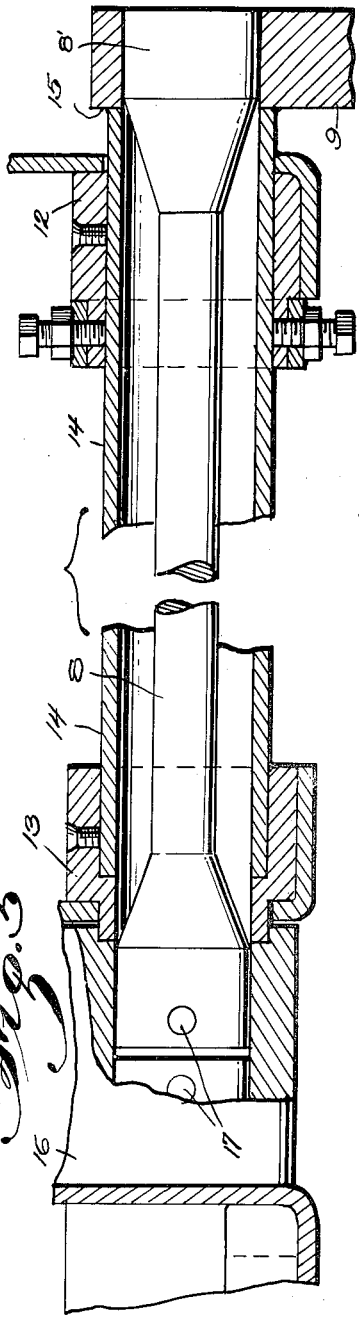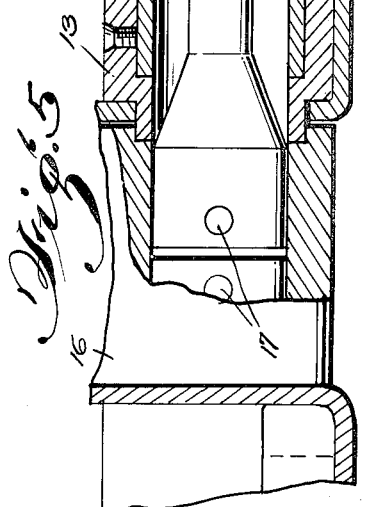

Patented Mar. 4, 1952

2,587,624

UNITED STATES PATENT OFFICE 2,587,624

RETRACTABLE WHEEL SUSPENSION FOR VEHICLES

Harold E. Johnson, Jeffersonville, Ind.

Application May 27, 1948, Serial No. 29,610

1 Claim. (Cl. 280—44)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to vehicles generally, but particularly to two-wheeled vehicles such as trailers, and has for a primary object to provide a vehicle in which a spring mount is installed between the vehicle body and wheels and in which the vehicle wheels are easily and simply retracted to lower the vehicle body to the ground so that it may be converted into a sled if runners are provided, or in any event may rest on the ground thus avoiding the necessity of jacks or the like for maintaining the body in horizontal position, and also positioning the body for simplification of loading and unloading.

A further object of the invention resides in the provision of novel and simplified means for expeditiously raising and lowering the wheels of the vehicle.

Other objects and advantages of the invention will be apparent from the following description when taken in connection with the accompanying drawings, in which, Figure 1 is a bottom plan view of the vehicle with parts broken away;

Figure 2 is a longitudinal sectional view, parts being shown in elevation;

Figure 3 is a detail view of one of the torsion arms and related parts;

Figure 4 is a vertical sectional view taken on the line 4—4 of Figure 2, and;

Figure 5 is a longitudinal sectional view partly broken away showing one of the torsion rod sections and its housing.

Figure 1:
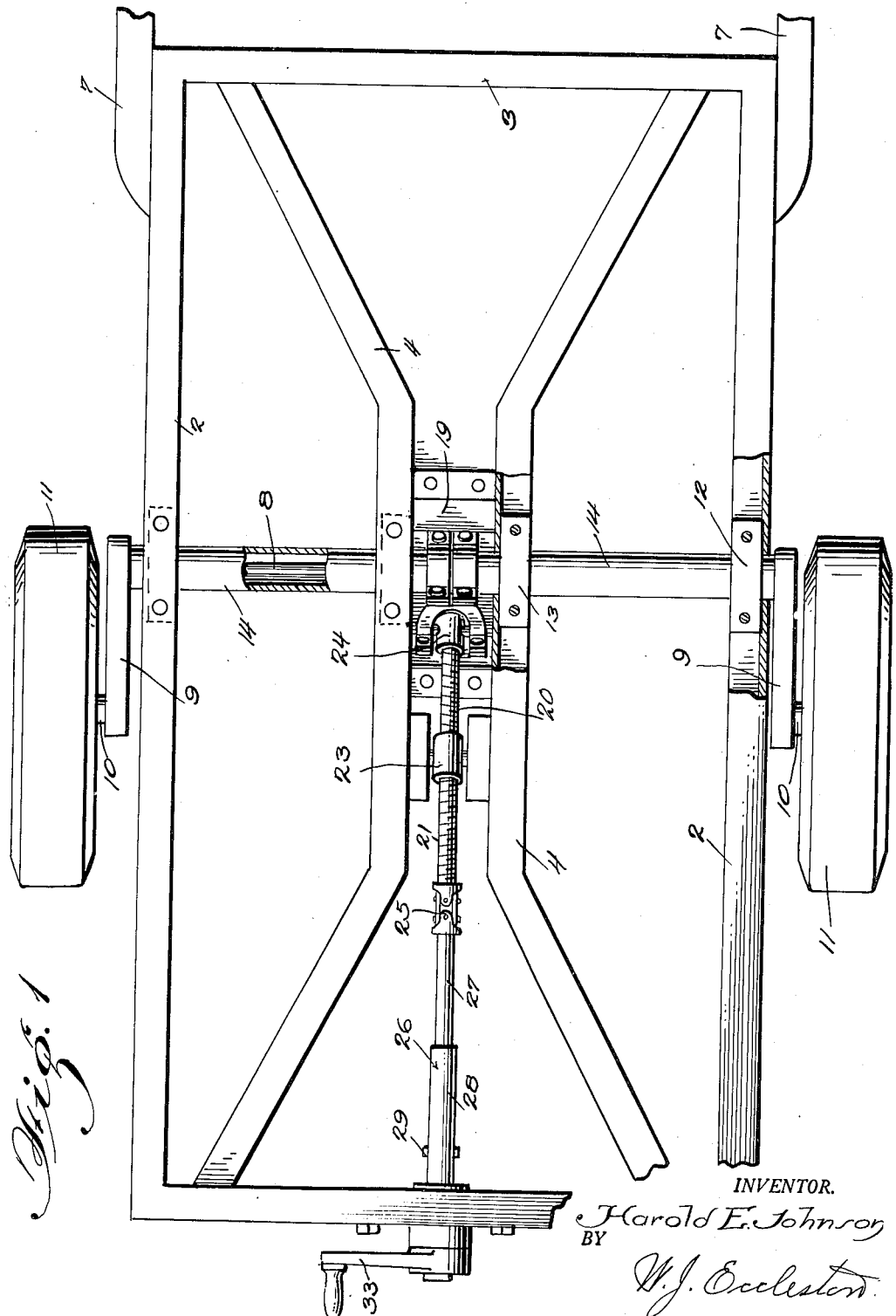

The invention is illustrated in the attached drawings as incorporated in a two-wheeled vehicle such as a trailer, and the body of the vehicle, which is indicated generally by the numeral 1, comprises a rectangular frame composed of longitudinal and transverse channel members 2 and 3 respectively, and reinforcing channel members 4. The floor or load-supporting portion of the vehicle body is indicated by the numeral 5.

As hereinbefore mentioned, the wheels of the vehicle are retractible so that the body may be lowered to the ground when the vehicle is not in motion, and the body is accordingly provided with supports 6 at its opposite ends to rest upon the ground, but if desired runners may be added to convert the wheeled vehicle into a sled when desired. A yoke 7 shown fragmentarily in Figures 1 and 2 is secured to the body for connecting the same to a tractor or the like.

Extending transversely of the vehicle body, about mid-way of the length thereof, is a torsion rod composed of two sections 8 each extending from about the center line of the body to a point beyond the sides thereof. The body of each torsion rod section 8 is of circular-cross section while the ends 8' thereof are indicated as oval in contour although any non-circular formation may be used. To the outer oval ends of the torsion rods are attached torsion arms 9 provided with oval openings corresponding in size and shape to the ends of the torsion rod and engaged thereover. Rotatably mounted on the outer ends of the torsion arms 9 as by means of shafts 10 are wheels 11 of any preferred type.

The vehicle body is provided with pairs of spaced bearings 12 and 13 in which are oscillatably mounted the shafts 14, the outer ends of which are welded or otherwise fixedly secured to the torsion arms 9 as indicated by numeral 15. To the inner oval ends of the torsion rod sections 8 is secured a crank arm 16, and these ends also are located in an oval opening of the crank arm so as to prevent relative rotation between the parts, and are permanently fixed therein as by means of pins 17.

The crank arm 16 is to be oscillated for raising and lowering the wheels 11 so as to lower the body to position for loading or unloading and to raise it when the vehicle is to be moved from one place to another, and the means employed for this purpose comprises a rotatable shaft 20 provided with right and left hand threads 21 and 22 which cooperate with similarly threaded sleeves 23 and 24 pivotally mounted on the vehicle body and crank respectively. The shaft 20 is connected by a universal joint 25 with an extensible rod 26 comprising the telescopically-arranged members 27 and 28 provided with a pin and slot connection as indicated by the numeral 29. The extensible rod 26 is rotatably mounted in a self-aligning bearing 30. This bearing is provided with laterally extending pins 31 which are oscillatably mounted in trunnions 32 fixed to the vehicle body in any preferred manner.

The extensible rod 26 is rotated by means of a crank 33 which is connected to the rod by a conventional reversible pawl and ratchet indicated generally by the numeral 34 so that the rod may be rotated in either direction when the vehicle body is close to the ground and a complete rotation of the handle 33 would be rendered impossible.

A lock such as a slidable bolt 35 is mounted on the rear end of the vehicle body adjacent the hand crank 33 and is adapted to be moved into the path of movement of the crank so as to lock it against rotation as occasion may require.

It will be readily understood that when the lock 35 is moved to inoperative position and the hand crank 33 operated to rotate the extensible rod 26 and threaded shaft 20 the right and left hand threaded connection between the shaft and the internally threaded sleeves 23 and 24 will tend to cause these sleeves to move either toward or away from each other depending upon the direction of rotation of the shaft. However, since the sleeve 23 is fixed against longitudinal movement with respect to the vehicle body the rotation of the shaft in one direction will cause the sleeve 24 to move to the right (Fig. 2) and to also cause the shaft 20 to move in the same direction, thereby increasing somewhat the speed of rotation of the crank 16. Likewise, when the shaft 20 is rotated in the opposite direction a corresponding reverse movement of the sleeve 24 and shaft 20 is provided. As the crank 16 approaches a vertical position the torsion arms 9 will be raised sufficiently to bring the lower rims of the wheels 11 into a plane above the plane of the rests 6 thereby depositing the vehicle body upon the ground or upon the floor of the warehouse, as the case may be. Likewise, a reverse movement of the crank 16 will lower the torsion arms 9 and their wheels 11 thereby raising the vehicle body above the ground or floor of a warehouse and positioning it for travel; it being understood, of course, that the torsion rod sections 8 and torsion arms 9 provide a spring suspension between the vehicle body and the wheels 11. In the tractor illustrated herein the floor 5 is provided with an opening 18 to prevent interference between the floor and the parts 16 and 22, and this opening, as well as the parts 16 and 22, are inclosed by a dome-shaped member 19.

From the foregoing description and the attached drawings it will be obvious to those skilled in the art that I have provided a two-wheel type of trailer or other vehicle wherein the vehicle body may be readily lowered to the ground and thus maintained in a stable manner without the use of jacks or other secondary supports; that the arrangement provides a simple means by which the vehicle body may be advantageously disposed for loading and unloading; and the entire mechanism may be manually operated simply and expeditiously by a mere rotation of the crank arm 33 in the proper direction.

While a specific form of the invention has been shown and described herein, it is intended that this disclosure be considered as illustrative of the invention rather than in a limiting sense, and that the scope of the invention be measured by the appended claim.

I claim:

In a vehicle, a frame, a torsion rod mounted transversely of the frame about midway of the length thereof and below its upper surface, torsion arms rigidly connected to the outer ends of the rod, wheels rotatably mounted on the arms, a crank arm connected to said rod approximately midway of the length of the latter, right and left hand internally threaded sleeves pivotally connected to said crank arm and frame, a shaft threaded to said sleeves, an extensible rod rotatably mounted on the frame, a universal joint between said extensible rod and shaft, a handle for the shaft, and a reversible pawl and ratchet connecting the handle to the shaft for rotating the extensible rod.

HAROLD E. JOHNSON.

REFERENCES CITED

The following references are of record in the file of this patent:

UNITED STATES PATENTS

| Number | Name | Date |
| --- | --- | --- |
| 353,133 | Hammond | Nov. 23, 1886 |
| 1,708,649 | Bente | Apr. 9, 1929 |
| 2,227,762 | Ronning | Jan. 7, 1941 |
| 2,453,388 | Schramm | Nov. 9, 1948 |